Figure 1:
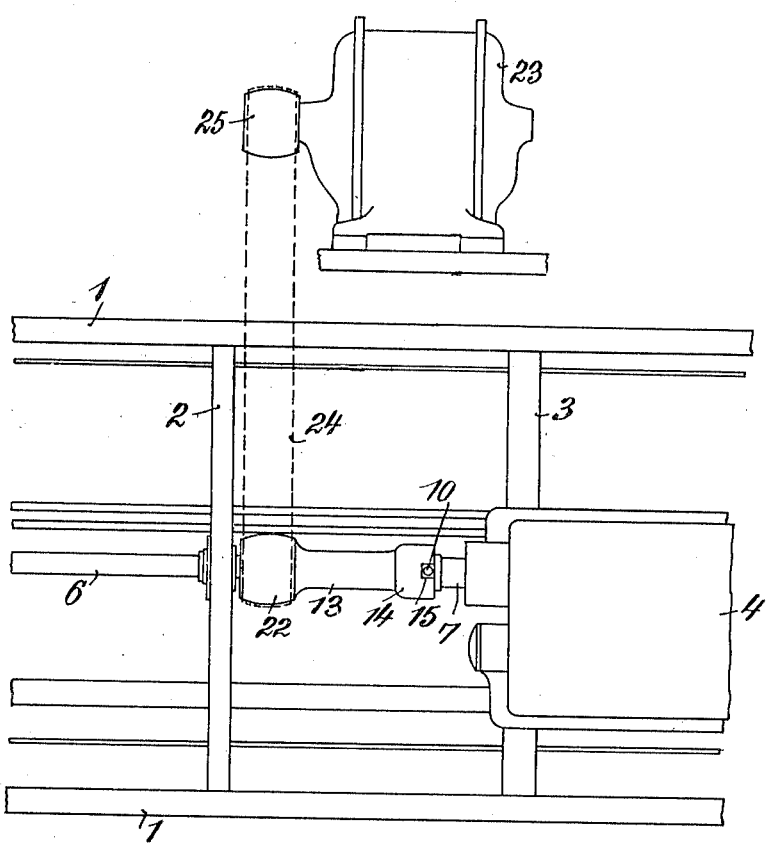

H. MAYER.
TRANSMISSION IN MOTOR VEHICLES.
APPLICATION FILED FEB. 11, 1913.

1,072,389.

Patented Sept. 2, 1913.

2 SHEETS—SHEET 1.

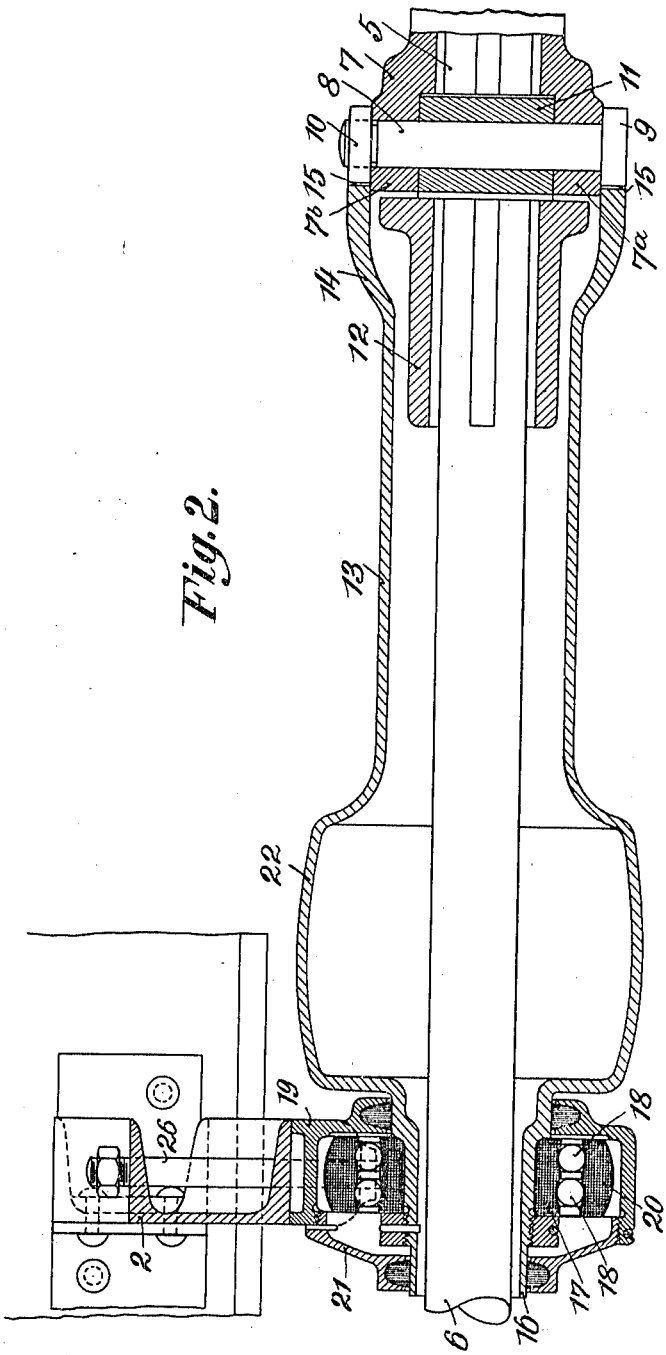

UNITED STATES PATENT OFFICE.

HEINRICH MAYER, OF ARBON, SWITZERLAND.

TRANSMISSION IN MOTOR-VEHICLES.

1,072,389.  Specification of Letters Patent.  Patented Sept. 2, 1913.

Application filed February 11, 1913. Serial No. 747,592.

*To all whom it may concern:*

Be it known that I, HEINRICH MAYER, a citizen of the Republic of Switzerland, residing at Arbon, in Switzerland, have invented a new and useful Transmission in Motor-Vehicles, of which the following is a specification.

In motor-vehicles, such as automobiles, outotrucks, and the like, it is often desirable to temporarily transmit power from an intermediate part of the power shaft by means of belting to some device or apparatus beside the stopping motor-vehicle. In case the intermediate part of the power shaft is disposed behind the gearing-box and is coupled with the respective shaft in the gearing-box by means of a universal joint for the purpose of being able to follow any winding or torsion of the carriage-frame, in general the disposition of an ordinary belt pulley on this intermediate shaft would present great difficulties as the belt might not keep running regularly, but slide off.

My invention relates to a novel transmission for such motor-vehicles, whereby the belt is enabled to run regularly in any case.

The novel transmission consists of a tubular shaft surrounding the said intermediate shaft and coupled at one end with the member of the universal joint on the shaft projecting from the gearing-box and mounted to turn with the other end in a suitable bearing, preferably a ball-bearing, connected with the carriage frame, the said tubular shaft carrying the belt-pulley. Where so preferred, this tubular shaft may be made in one with the belt-pulley.

I will now proceed to describe my invention with reference to the accompanying drawing, in which—

Figure 1 is a plan view of a part of the carriage-frame of any motor-vehicle, which is provided with the novel transmission, the device or apparatus beside the vehicle being assumed to be a dynamo, which is turned through an angle of 90° for the purpose of giving an idea of the whole arrangement, and Fig. 2 is a vertical longitudinal section on an enlarged scale through the novel transmission.

Similar characters of reference refer to similar parts in both views.

Fig. 1 shows a part of the carriage frame of any known motor-vehicle, which frame is assumed to consist of two longitudinal side bars 1, 1 and several cross bars, of which two are denoted by 2 and 3. A gearing-box 4 is partly shown, which is supported by the frame 1, 2, 3 in any known manner and comprises a projecting shaft 5 (Fig. 2), which is driven from the motor (not shown) in any known manner and is connected with an intermediate shaft 6 by means of a universal joint shown as consisting of a forked member 7 fast on the projecting shaft 5, a bolt 8 passing through the two arms $7^a$, $7^b$ of the member 7 and having a square head 9 and a square nut 10, a crosshead 11 rocking on the bolt 8 and having two opposite pins (not shown), and another forked member 12 fast on the shaft 6 and pivotal on the two pins of the crosshead 11. I do not further describe the construction of the universal joint, as it is immaterial to my invention and may be varied. The intermediate shaft 6 is by the universal joint described enabled to follow any winding or torsion of the carriage frame while transmitting the power to the two rear wheels in any known manner.

According to my invention I provide a tubular shaft 13 surrounding the intermediate shaft 6 and having a widened right end 14, which engages over the two arms $7^a$, $7^b$ of the member 7 and has two opposite square notches 15, 15, into which the square head 9 of the bolt 8 and the square nut 10 can engage. The left end portion 16 of the tubular shaft 13 is reduced in diameter and has a ring 17 forced on it serving as an inner race for two parallel circular rows of balls 18, 18. Rigidly connected with the cross bar 2 by means of bolts 26 or the like is a suitable casing 19, which contains a ring 20 forced into it serving as an outer race for the said balls 18, 18. The casing 19 may be closed with a suitable cover 21 and it will be seen, that the parts 18, 18, 19, 20, 21 form a ball-bearing, in which the left end portion 16 of the tubular shaft 13 with the ring 17 is mounted to turn. I do not further describe this ball-bearing, as its construction is immaterial to my invention and may be varied. As the gearing-box 4 is rigidly connected with the carriage-frame 1, 2, 3, it will be evident, that the projecting shaft 5 keeps its position during the rotation and consequently the right end 14 of the tubular shaft 13 will run truly. Any belt-pulley 22 fastened on the tubular shaft 13 will therefore be fit for transmitting power from the shaft 5 to any device or apparatus, such as a dynamo 23 standing beside the stopping motor-vehicle by means of an endless belt 24 and a pulley 25 on the armature shaft. The belt 24 will not run off, while the intermediate shaft 6 is at liberty to follow any winding or torsion of the carriage-frame. Where so preferred, the pulley 22 may be made in one with the tubular shaft 13, as shown. The novel transmission described may be left on the vehicle while it is traveling on the road. Where so preferred this device for temporarily transmitting power may be attached and removed as desired.

The novel transmission may be varied in many respects without departing from the spirit of my invention.

I claim:

1. In a motor-vehicle, a frame, a gearing-box in said frame, a first shaft mounted in said gearing-box to turn and having an end projecting therefrom, a second shaft mounted at one end to turn in said frame, a universal joint for connecting the projecting end of said first shaft with the other end of said second shaft and comprising a member fastened on the end of the first shaft, and means connected with said member of said universal joint for transmitting the power by means of belting to any device or apparatus beside the stopping motor-vehicle.

2. In a motor-vehicle, a frame, a gearing-box in said frame, a first shaft mounted in said gearing-box to turn and having an end projecting therefrom, a second shaft mounted at one end to turn in said frame, a universal joint for connecting the projecting end of said first shaft with the other end of said second shaft and comprising a member fastened on the end of the first shaft, a bearing in said frame, a tubular shaft surrounding said second shaft, coupled at one end with said member of said universal joint and mounted to turn with the other end in said bearing, and a belt-pulley on said tubular shaft for transmitting the power to any device or apparatus beside the stopping motor-vehicle.

3. In a motor-vehicle, a frame, a gearing-box in said frame, a first shaft mounted in said gearing-box to turn and having an end projecting therefrom, a second shaft mounted at one end to turn in said frame, a universal joint for connecting the projecting end of said first shaft with the other end of said second shaft while permitting the second shaft to follow any winding or torsion of said frame, said universal joint comprising a member fastened on the end of the first shaft and having projections, a bearing in said frame, and a tubular shaft surrounding said second shaft, having at one end notches into which said projections of said universal joint engage and mounted to turn with the other end in said bearing, said tubular shaft being so shaped as to form a belt-pulley for transmitting the power to any device or apparatus beside the stopping motor-vehicle.

HEINRICH MAYER.

Witnesses:
RANDALL ATKINSON,
EUGENE NABEL.

---

Copies of this patent may be obtained for five cents each, by addressing the "Commissioner of Patents, Washington, D. C."